United States Patent Office 2,820,812
Patented Jan. 21, 1958

2,820,812

MANUFACTURE OF ACRYLIC NITRILE

Robert Lichtenberger, Oullins, and Marcel Borrel and Bernard Chatelin, Pierre-Benite, France, assignors to Societe Industrielle des Derives de l'Acetylene (S. I. D. A.), Paris, France, a corporation of France Application June 8, 1956, Serial No. 590,206

Claims priority, application France June 10, 1955

4 Claims. (Cl. 260—465.3)

The present invention relates to improvements in the manufacture of acrylic nitrile.

At the present time, this nitrile is most frequently manufactured by combining acetylene and hydro-cyanic acid in contact with a catalyst constituted by an acid solution of cuprous chloride. This reaction should be carried out in the presence of a large excess of acetylene which carries away the products of the reaction with it. The acrylic nitrile, which is in general extracted from this flow of gas by washing with water, is then obtained in the form of a dilute aqueous solution of two to five percent, which is then distilled. The gases which are not dissolved by this washing process, containing acetylene in excess and impurities, are recycled back to the reactor.

During the course of the reaction, a large number of sub-products are formed which affect more or less adversely the production of a very pure acrylic nitrile, or the duration or life of the reaction catalyst. Amongst these sub-products, there may be distinguished:

(a) Those which can be extracted at the same time as the acrylic nitrile, but which can be separated more or less easily from the nitrile by the usual methods of fractional distillation. These are essentially the hydrocyanic acid which has not reacted, acetaldehyde, lacto-nitrile and various products of high boiling points.

(b) Those which are also extracted with the acrylic nitrile, but which cannot be entirely eliminated by fractional distillation; this applies to the case of the dienes, such as chloroprene, di-vinyl-acetylene and cyano-butadiene and methyl-vinyl-ketone. Now all these compounds are particularly troublesome, even in the state of the smallest traces, when it is desired to polymerise the acrylic nitrile.

(c) Those which are volatile and insoluble in water; these are particularly troublesome to the continuance of the reaction, because they collect in the gases of the cycle, in which their concentration progressively increases, and in which they become partly converted to polymers in contact with the catalyst, the activity of which they thereby reduce. Amongst these sub-products, there may be cited vinyl chloride, mono-vinyl-acetylene, and, to a certain extent, di-vinyl-acetylene, a part of which is also extracted with the other dienes referred to under (b) above A number of methods have been suggested for eliminating these sub-products, on the one hand in the acrylic nitrile itself and, on the other hand, in the gases which are re-circulated.

Thus, in order to purify the acrylic nitrile itself, it has been suggested:

On the one hand, to employ physical methods of purification such as azeotropic distillation, selective extraction by various solvents, and carrying-off the impurities by means of inert gases.

On the other hand, to use chemical methods of purification by the application of various reagents, mainly in the liquid phase, and especially sulphuric acid, chlorine and bromine.

It has in fact been known for a long time that chlorine and bromine are readily fixed on the majority of the double links, but that, contrary to this general property, they are only fixed with great difficulty on the double links of the alpha-beta ethylenic nitriles, such as acrylic nitriles. It has therefore been proposed to purify crude, dry, acrylic nitrile, preferably previously isolated from the reaction gases, from the polymers of acetylene which it contains, by introducing thereto a fairly high proportion of gaseous or liquid non-diluted chlorine or bromine at temperatures comprised between 0 and 30° C. or in the near vicinity of these temperatures.

It has also been proposed to purify the gases of the cycle by liquefying them at low temperature after having first of all eliminated all the moisture and in then rectifying them so as to allow only the acetylene to escape. Finally, it has been attempted to extract the impurities other than acetylene by washing by means of a not very volatile solvent, or by adsorption on activated carbon or other adsorbent product.

The various methods proposed up to the present for the elimination of the sub-products of the gases to be recycled and/or of acrylic nitrile, have however a number of drawbacks: some of them only give inadequate and partial results, and almost all of them require complicated and costly apparatus, give rise to losses of acetylene and/or of acrylic nitrile and/or finally necessitate the use of costly solvents which sometimes cannot be recovered. Furthermore, the major disadvantage of the majority of these known methods is that each of them only permits of the elimination, even partial, of one certain type of impurities, and that a combination, difficult to effect in practice, of various methods is always necessary in order to obtain results which are better, although still insufficient. In addition, in most cases, these methods do not contemplate the purification of the gases to be recycled.

Now the importance of acrylic nitrile in itself or as an intermediate or starting product for a large number of industrial manufactures, together with the exacting requirements of purity in the case in which it is to be polymerised, are constantly giving rise to attempts to improve the known methods of its production. The present invention enables the troublesome impurities formed at the same time as the acrylo-nitrile during the course of the reaction of hydrocyanic acid on acetylene, to be eliminated.

The invention rests on the discovery that chlorine water, when put into contact with the gaseous mixture liberated from the catalytic reaction, acts selectively on the troublesome impurities while remaining without practically any effect on the acetylene and on the acrylic nitrile, in the case in which the latter is present.

The speeds of chlorination by chlorine water at ambient temperatures for each of the products which are capable of being affected by the above treatment are given below, the speed of chlorination of acrylic nitrile being taken as unity:

| | |
|---|---|
| Acrylic nitrile | 1 |
| Acetylene | 6 |
| Acetaldehyde | 42 |
| Vinyl chloride | 185 |
| Mono-vinyl-acetylene | 600 |
| Di-vinyl-acetylene | 600 |
| Chloroprene | (1) |
| Cyano-butadiene | (1) |
| Methyl-vinyl-ketone | (1) |

[1] No figures given, but very rapid.

In particular, in accordance with the present invention it has been found that it is possible to use the low speed of fixation of chlorine on the double link of acrylic nitrile, and that such a contact with chlorine water of the gaseous mixture issuing from the catalysis transforms all the impurities into non-reactive chlorine products which are insoluble in water, from which they are separated in the form of a dense liquid, by simple decantation.

In accordance with the present invention, the improvement made to the method of manufacture of acrylic nitrile by catalytic reaction of hydrocyanic acid on acetylene, thus consists essentially in putting the gaseous mixtures containing the impurities to be eliminated into contact with an aqueous solution of chlorine in which the latter is present in a quantity corresponding to, or only slightly greater than the content of the said impurities, in separating the latter by decantation in the form of products insoluble in water, and in treating the purified gases in known manner so as to separate therefrom the acrylic nitrile which may eventually be present.

The method is preferably applied to the gaseous mixtures issuing from the catalytic reaction and which contain the acrylic nitrile. There is thus obtained a simultaneous purification of the gases to be re-cycled and of the acrylic nitrile, which is subsequently separated from the mixture in a state of very high purity.

The method may also be applied to the gases to be re-cycled after the acrylo-nitrile has been separated out. The continuous purification of these gases has a favourable influence, not only on the useful life of the catalyst, but also indirectly on the quality of the acrylic nitrile.

The process of contact in accordance with the invention may consist, for example, of a washing with chlorine water which preferably circulates in parallel flow with the gases proceeding from the reactor, or of an injection of gaseous chlorine combined with sprinkling with water. The quantity of chlorine introduced is preferably such that it corresponds in stoichiometric quantity to the sum of the quantities necessary for the chlorination of each of the types of impurity. It thus avoids all contamination of the final product by chlorine in excess. This quantity is exactly determined in each case by measurement of the residual content, for example of mono-vinyl-acetylene, of the gases after the treatment.

The temperature of operation is preferably comprised between about 20° and 50° C.; it may also rise to the temperature of the gaseous mixture passing out of the catalysis, that is to say in the vicinity of 80° C.

The separation of the acrylo-nitrile is effected by the known methods, by means of a washing with water, followed by fractional distillation of the aqueous solution. It is then only necessary to rectify the acrylo-nitrile, if this is still necessary, by simply eliminating the more volatile fractions and the heavier fractions.

It will be noted that the chlorination of the gases by means of chlorine water is a regular reaction which involves no risk of explosion as long as only the quantity of chlorine necessary is introduced, or at the most a small excess with respect to the quantity consumed by the impurities. In all cases, there is an advantage in only introducing the minimum quantity of chlorine necessary: by this means there is avoided, on the one hand a subsequent reducing or alkaline treatment intended to destroy any harmful excess of reagent if this has been carried as far as the catalyst by the re-cycling gases, and on the other hand, the reaction of such an excess of chlorine on the acrylic nitrile or on the acetylene, these reactions resulting in a reduction in the output.

The fresh acetylene is preferably introduced into the re-cycling circuit after the elimination of the arcylic nitrile and the impurities. It may also be introduced after the catalytic reaction and before the chlorination.

The apparatus for carrying into effect the above-described process preferably comprises a washing column supplied at its head with a dilute solution of chlorine in water. The column may also be subjected to a sprinkling or internal trickling action of water, gaseous chlorine being also injected at the head of the column, at which the chlorinated aqueous washing solution is then formed.

The liquid formed by the reaction of the impurities with the chlorine water is decanted at the base of the washing column, from which it may be drawn-off. It may also be re-cycled in part in this column.

The purified gases, if they contain acrylic nitrile, are preferably washed in a second column at a temperature in the vicinity of the ambient temperature, by a flow of water: the acrylic nitrile is thus extracted in the form of a dilute solution which is collected at the base of this second column. The chlorination column and the column for extracting the acrylic nitrile may also be combined into a single unit, for example by introducing water and chlorine at the top of the extraction column. In this case, the top portion of this column operates as a column for treating the gases, while its lower part acts as an extraction column for the acrylo-nitrile. The gases are introduced at the foot of the column, which operates in counterflow.

The above improvements are explained in more detail in the description given below of various possibilities of embodiment, reference being made to the accompanying drawings, in which.

Figure 1:
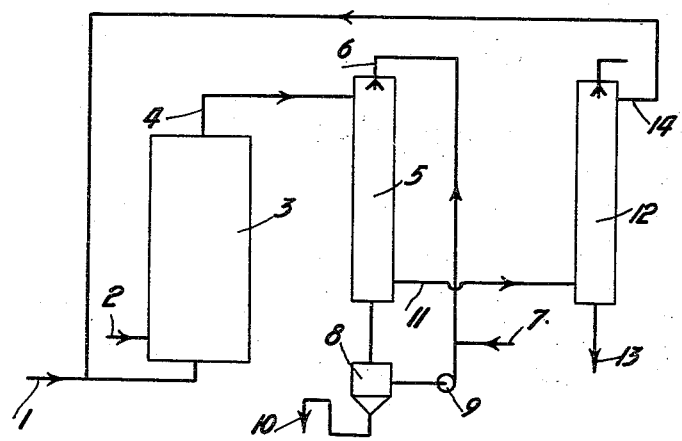
Fig. 1 shows diagrammatically an apparatus which can be used for the application of the method to the gaseous mixture derived from the catalytic reaction.

In the form of application shown in Fig. 1, the acetylene is introduced at 1 and the hydrocyanic acid at 2, into a reaction vessel 3 which contains the catalyst employed. From the outlet 4 of the reactor 3, the gaseous mixture which is constituted by acetylene in excess and the products of the reaction, is introduced at the head of a chlorination column 5. At the head of the column 5 there is also introduced at 6 a solution of chlorine water at a concentration of 0.5 to 2 grams of chlorine per litre; this solution of chlorine water is formed by the injection at 7 of chlorine into the conduit which supplies sprinkling water to the column.

Under the column 5 is arranged a separator 8, to which are connected a re-cycling conduit with a pump 9, connected at its other extremity to the head 6 of the column 5, and also a piping system 10 for the evacuation of the chlorinated products which are decanted in the separator.

The gases washed with chlorine water and freed from the various impurities, such as especially vinyl chloride, mono-vinyl-acetylene and di-vinyl-acetylene, chloroprene, and cyano-butadiene, pass out of the column 5 through the piping system 11 which introduces them at the base of a column 12 in which the aqueous solution of acrylic nitrile is formed and flows at 13 from the base of the column. The purified excess acetylene passes out at 14 from which it is re-cycled to the reactor 3. The aqueous solution of acrylic nitrile passing out at 13 is distilled in an apparatus (not shown) which is known per se, and which separates out the acrylic nitrile in a very pure, dry state.

The purification of the gases to be recycled prevents or decreases the progressive and rapid poisoning of the catalyst and the formation of highly polymerised products.

In a production unit such as that described above, working has been carried out with chlorine water at a concentration of 2 grams chlorine per litre. The acrylic nitrile obtained was recovered in the pure state by fractional distillation.

Following tests which have been made, there has been indicated in the table given below, the residual proportion of certain impurities in accordance with the proportion of chlorine introduced. The acetylene and the hydrocyanic acid introduced into the reactor were in a molar proportion equal to 10.

| Chlorine introduced in kg. of Cl₂ per kg. of acrylic nitrile produced | Re-cycled gases | | Acrylic nitrile |
|---|---|---|---|
| | Mono-vinyl-acetylene | Di-vinyl-acetylene | Di-vinyl-acetylene percent |
| | in mg. per litre of gas | | |
| 0 | 83.3 | 5 | 0.05 |
| 0.09 | 52.4 | 0.6 | 0.018 |
| 0.13 | 13.1 | 0.026 | 0.001 |
| 0.2 | <5 | <0.02 | 0.0004 |

It can be seen that the contents of mono- and di-vinyl-acetylene are very greatly reduced as the quantity of chlorine introduced increases. It is not feasible to indicate a constant proportion of chlorine to be introduced into the circuit, because this proportion depends on the content of impurities in the gases at the outlet of the reactor, and because this content itself is essentially variable, depending on the type of catalyst employed, the age of this catalyst, and the particular conditions of working.

Figure 2:
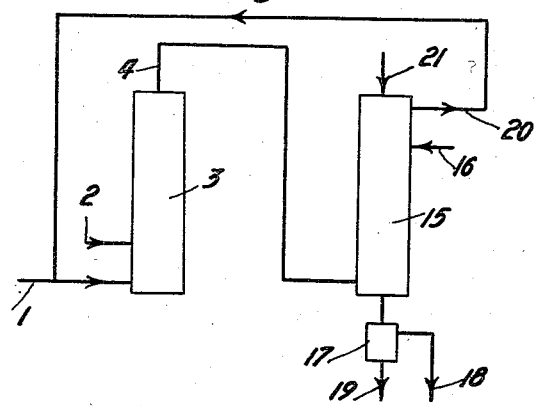
Fig. 2 shows, for the same kind of application, an apparatus in which there is carried out in the same column the elimination of the impurities by washing by means of chlorine water and the dissolving of the acrylic nitrile.

In the method of working put into practice by the apparatus shown in Fig. 2, and which enables, in the same way as that of Fig. 1 the method to be applied to the gaseous mixture derived from the catalytic reaction, gaseous chlorine is introduced into the column in which the acrylic nitrile is extracted. This process has similar effects to the washing of the reaction gases by chlorine water in a separate column placed in front of the extraction column. There is simultaneously carried out in the same chamber, the purification of the gases to be re-cycled and the extraction of the acrylic nitrile. With this arrangement, from the reactor 3, supplied with acetylene at 1 and with hydrocyanic acid at 2, the resulting gases pass out at 4 and are led to the base of the column 15. Water is introduced into the column 15 at 16 and chlorine gas at 21. The chlorine water formed in situ washes in counterflow the gaseous mixture which comes from the reactor 3. The purified gases to be re-cycled, containing acetylene in excess, pass out at 20, from which point they are re-cycled to the reactor 3. The aqueous solution of acrylic nitrile and an oil flow down to the base of the column 15, the oil being non-miscible and more dense than this solution, and being mainly constituted by chlorinated derivatives of mono-vinyl-acetylene and di-vinyl-acetylene. The separation of the solution and the oil is effected in the vessel 17 arranged as a decanting vessel. The solution of acrylic nitrile passes out at 18 and the oil at 19.

There has been indicated in the table given below the improvement in the contents of mono-vinyl-acetylene and of di-vinyl-acetylene in the re-cycled gases and in the acrylic nitrile obtained, by virtue of the use of the method of operation shown in Fig. 2.

| | Chlorine introduced in kg. of Cl₂ per kg. of acrylic nitrile produced | Re-cycled gases | | Acrylic nitrile |
|---|---|---|---|---|
| | | Mono-vinyl-acetylene, mg. per litre of gas | Di-vinyl-acetylene mg. per litre of gas | Di-vinyl-acetylene percent |
| Without chlorination | ---- | 80 | 5 | 0.05 |
| After 10 hours working | 0.12 | 13 | 0.35 | 0.004 |
| After 18 hours working | 0.12 | Not determined | 0.03 | 0.002 |

Figure 3:
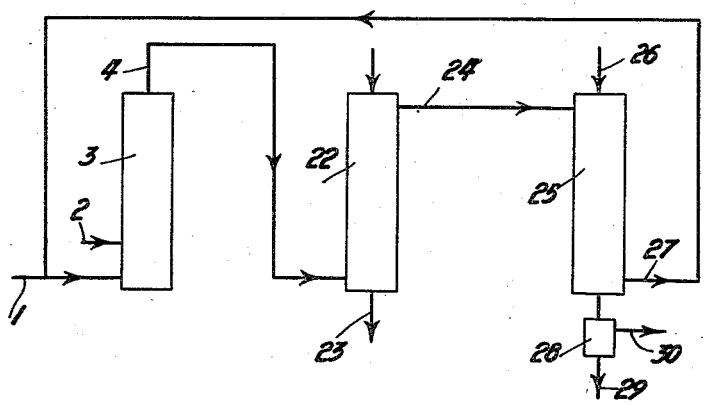
Fig. 3 shows diagrammatically an apparatus which can be used for the application of the method to the re-cycled gases, from which the acrylic nitrile has already been eliminated.

In the alternative embodiment, using the apparatus of Fig. 3, the acetylene is introduced at 1 and the hydrocyanic acid at 2 into the reactor 3, containing the catalyst employed. From the outlet 4 of the reactor 3, the gaseous mixture constituted by acetylene in excess and the products of the reaction, is introduced at the base of the column 22 in which the acrylic nitrile is extracted by washing with water; the aqueous solution of nitrile flows out at 23 from the base of the column 22. The gases, comprising in particular excess acetylene, pass out at 24 from the top of the column 22 and are introduced into the top of the chlorination column 25; at the head of the column 25 there is also introduced at 26 a solution of chlorine water at a concentration of 1.8 grams per litre. The purified gases pass out at 27, from which point they are re-cycled to the reactor 3. The liquids passing out of the base of the column 25 are passed into a separator 28 in which the impurities are separated by decantation from the washing solution; they flow out at 29 from the base of the separator 28; the washing solution passing out at 30 can be re-cycled, as shown in Fig. 1.

There has been indicated in the table given below, the proportion of certain impurities found in the gases at 24 before the chlorination treatment and at 27 after the chlorination treatment.

| Rate of flow of gases in cu. m. per hour | Rate of flow of chlorine in grams per hour | Analysis of the gases | | | |
|---|---|---|---|---|---|
| | | Before chlorination | | After chlorination | |
| | | Mono-vinyl-acetylene mg./l. | Di-vinyl-acetylene mg./l. | Mono-vinyl-acetylene mg./l. | Di-vinyl-acetylene mg./l. |
| 6 | 35 | 72 | 3.6 | 48 | 1.5 |
| 6 | 54 | 78 | 2.8 | 46 | 0.5 |
| 6 | 90 | 83 | 5.2 | 21 | <0.2 |

The reduction of the content of impurities in the gas at 27 has the effect of increasing the life of the catalyst and also of considerably reducing the amount of the impurities in the acrylo-nitrile extracted at 22.

What we claim is:

1. In a method of making acrylic nitrile by reacting acetylene and hydrocyanic acid in the liquid phase in the presence of a catalyst constituted by a cuprous salt solution to form a mixture of acrylic nitrile, acetylene and impurities in the gaseous state, the improvement in removing said impurities which comprises contacting a mixture containing acrylic nitrile, acetylene and said impurities in the gaseous state with an aqueous solution of chlorine in which the chlorine content corresponds at most to a quantity only slightly greater than the content of said impurities, thereby converting said impurities into chlorinated products which are insoluble in water without substantial chlorination of said acetylene or of said acrylic nitrile, and removing said chlorinated products from said aqueous solution of chlorine.

2. A method of making acrylic nitrile, which comprises reacting acetylene and hydrocyanic acid in the liquid phase in the presence of a catalyst constituted by a cuprous salt solution to form a mixture of acrylic nitrile, acetylene and impurities in the gaseous state, contacting said mixture in the gaseous state with an aqueous solution of chlorine in which the chlorine content corresponds at most to a quantity only slightly greater than the content of said impurities, thereby converting said impurities into chlorinated products which are insoluble in water without substantial chlorination of said acrylic nitrile or said acetylene, removing said chlorinated products from the purified gases containing acrylic nitrile and acetylene, washing the purified gases with water to extract acrylic nitrile and form an aqueous solution of acrylic nitrile, separating the acrylic nitrile from said aqueous solution, and recycling the purified gases containing acetylene.

3. A method of making acrylic nitrile, which comprises reacting acetylene and hydrocyanic acid in the liquid phase in the presence of a catalyst constituted by a cuprous salt solution to form a mixture of acrylic nitrile, acetylene and impurities in the gaseous state, contacting said mixture in the gaseous state with an aqueous solution of chlorine in which the chlorine content corresponds at most to a quantity only slightly greater than the content of said impurities, thereby converting said impurities into chlorinated products which are insoluble in water without substantial chlorination of said acrylic nitrile or said acetylene, removing the mixture of said chlorinated products and chlorine water from the purified gases containing acrylic nitrile and acetylene, separating said chlorinated products from said chlorine water, utilizing said chlorine water for treating a further quantity of a mixture of acrylic nitrile, acetylene and impurities in the gaseous state, washing the purified gases containing acrylic nitrile and acetylene with water to extract acrylic nitrile and form an aqueous solution of acrylic nitrile, and separating the acrylic nitrile from said aqueous solution, and recycling the purified gases containing acetylene.

4. A method of making acrylic nitrile, which comprises reacting acetylene and hydrocyanic acid in the liquid phase in the presence of a catalyst constituted by a cuprous salt solution to form a mixture of acrylic nitrile, acetylene and impurities in the gaseous state, washing said gases with water to extract acrylic nitrile and form an aqueous solution of acrylic nitrile, separating acrylic nitrile from said aqueous solution, contacting the mixture of acetylene and impurities in the gaseous state with an aqueous solution of chlorine in which the chlorine content corresponds at most to a quantity only slightly greater than the content of said impurities, thereby converting said impurities into chlorinated products which are insoluble in water without substantial chlorination of said acetylene, and separating said chlorinated products from said acetylene.

References Cited in the file of this patent

UNITED STATES PATENTS

| | | |
|---|---|---|
| 2,382,383 | Carpenter | Aug. 14, 1945 |
| 2,526,676 | Lovett | Oct. 24, 1950 |
| 2,684,978 | Stehman | July 27, 1954 |
| 2,702,300 | Keller et al. | Feb. 15, 1955 |
| 2,733,259 | DeCroes et al. | Jan. 31, 1956 |